(12) United States Patent
Peart

(10) Patent No.: US 12,602,393 B2
(45) Date of Patent: Apr. 14, 2026

(54) MODULAR EXECUTION AND MANAGEMENT OF EXTRACT, TRANSFORM, LOAD (ETL) PROCESSES

(71) Applicant: Capital One Services, LLC, McLean, VA (US)

(72) Inventor: Errick Benson Peart, Smyrna, GA (US)

(73) Assignee: Capital One Services, LLC, McLean, VA (US)

( * ) Notice: Subject to any disclaimer, the term of this patent is extended or adjusted under 35 U.S.C. 154(b) by 93 days.

(21) Appl. No.: 18/630,749

(22) Filed: Apr. 9, 2024

(65) Prior Publication Data

US 2025/0315442 A1 Oct. 9, 2025

(51) Int. Cl.
*G06F 16/25* (2019.01)

(52) U.S. Cl.
CPC .................................. *G06F 16/254* (2019.01)

(58) Field of Classification Search
None
See application file for complete search history.

(56) References Cited

U.S. PATENT DOCUMENTS

| | | | |
|---|---|---|---|
| 8,688,625 | B1 | 4/2014 | Clark et al. |
| 11,182,407 | B1 * | 11/2021 | Yarlagadda ........... G06F 16/254 |
| 11,194,625 | B2 | 12/2021 | Chen et al. |
| 11,487,776 | B2 | 11/2022 | Bodziony et al. |
| 11,698,990 | B2 | 7/2023 | McFall et al. |
| 11,893,037 | B1 * | 2/2024 | Chidurala ............. G06F 16/254 |
| 12,118,395 | B1 * | 10/2024 | Virtuoso ............... G06F 9/5072 |
| 2007/0179939 | A1 | 8/2007 | O'Neil et al. |
| 2008/0147707 | A1 * | 6/2008 | Jin .................... G06F 16/24537 |
| | | | 707/999.102 |

(Continued)

FOREIGN PATENT DOCUMENTS

| | | |
|---|---|---|
| CN | 107451220 A | 12/2017 |
| CN | 111694888 A | 9/2020 |

OTHER PUBLICATIONS

"PySpark 3.5 Tutorial for Beginners with Examples"—pp. 1-19 <https://sparkbyexamples.com/pyspark-tutorial/> website visited Apr. 9, 2024.

(Continued)

*Primary Examiner* — Yu Zhao
(74) *Attorney, Agent, or Firm* — Banner & Witcoff, Ltd.

(57) ABSTRACT

The present disclosure describes a method and apparatus for the modularization, management, and maintenance of extract, transform, and load (ETL) operations. Aspects of the disclosure may provide for a management module from which to initialize operations for each stage of an ETL operation, manage configuration parameters for each stage of an ETL operation, and coordinate order of execution of each stage in an ETL operation. Further aspects described may include methods for validating configuration parameters before executing an ETL operation, logging status updates during an ETL operation, and logging completion times of each stage within an ETL operation. Further aspects described may also include interfacing with a third-party data processing or ETL framework to realize specific advantages of the third-party framework for an ETL operation while maintaining the modularization and management benefits described in the disclosure.

20 Claims, 8 Drawing Sheets

(56)                References Cited

U.S. PATENT DOCUMENTS

| | | | | |
|---|---|---|---|---|
| 2008/0168082 | A1* | 7/2008 | Jin | G06F 8/20 |
| | | | | 707/999.102 |
| 2012/0102007 | A1 | 4/2012 | Ramasubramanian et al. | |
| 2015/0025845 | A1 | 1/2015 | Mansfield | |
| 2015/0347261 | A1* | 12/2015 | Li | G06F 11/3452 |
| | | | | 707/602 |
| 2016/0210297 | A1* | 7/2016 | Francis | G06F 16/116 |
| 2020/0202278 | A1* | 6/2020 | Barton | G06Q 10/06315 |
| 2022/0222266 | A1* | 7/2022 | Makumbi | G06F 21/31 |
| 2024/0281419 | A1* | 8/2024 | Alfaras | G06F 16/215 |

OTHER PUBLICATIONS

"PySpark Tutorial"—Javapoint: pp. 1-10—<https://www.javatpoint.com/pyspark>, website visted Apr. 9, 2024.

Feb. 24, 2024—"PySpark Overview (3.5.1)"—Apache Spark; pp. 1-2 and 1-7 <https://spark.apache.org/docs/latest/api/python/index.html> <https://spark.apache.org/docs/latest/api/python/getting_started/quickstart_df.html>, website visited Apr. 9, 2024.

"PySpark"—Databricks: pp. 1-3 <https://www.databricks.com/glossary/pyspark>, website visited Apr. 9, 2024.

Apr. 1, 2024—"Tutorial: Load and transform data in PySpark Data Frames" Microsoft; pp. 1-6 <https://learn.microsoft.com/en-us/azure/databricks/getting-started/dataframes-python>, website visited on Apr. 9, 2024.

Dec. 16, 2018, Ben Weber "A Brief Introduction to PySpark: A primer on PySpark for data science" pp. 1-17 <https://towardsdatascience.com/a-brief-introduction-to-pyspark-ff4284701873>, website visited Apr. 9, 2024.

"Log4j" Wikipedia: pp. 1-7 <https://en.wikipedia.org/wiki/Log4j>, website visited Apr. 9, 2024.

"Extract, Transform, Load" Wikipedia: pp. 1-6 <https://en.wikipedia.org/wiki/Extract,_transform,_load>, website visited Apr. 9, 2024.

"Pyspark 3.5.1: pip install pyspark" PyPi: pp. 1-3 <https://pypi.org/project/pyspark/>, website visited Apr. 9, 2024.

* cited by examiner

FIG. 3

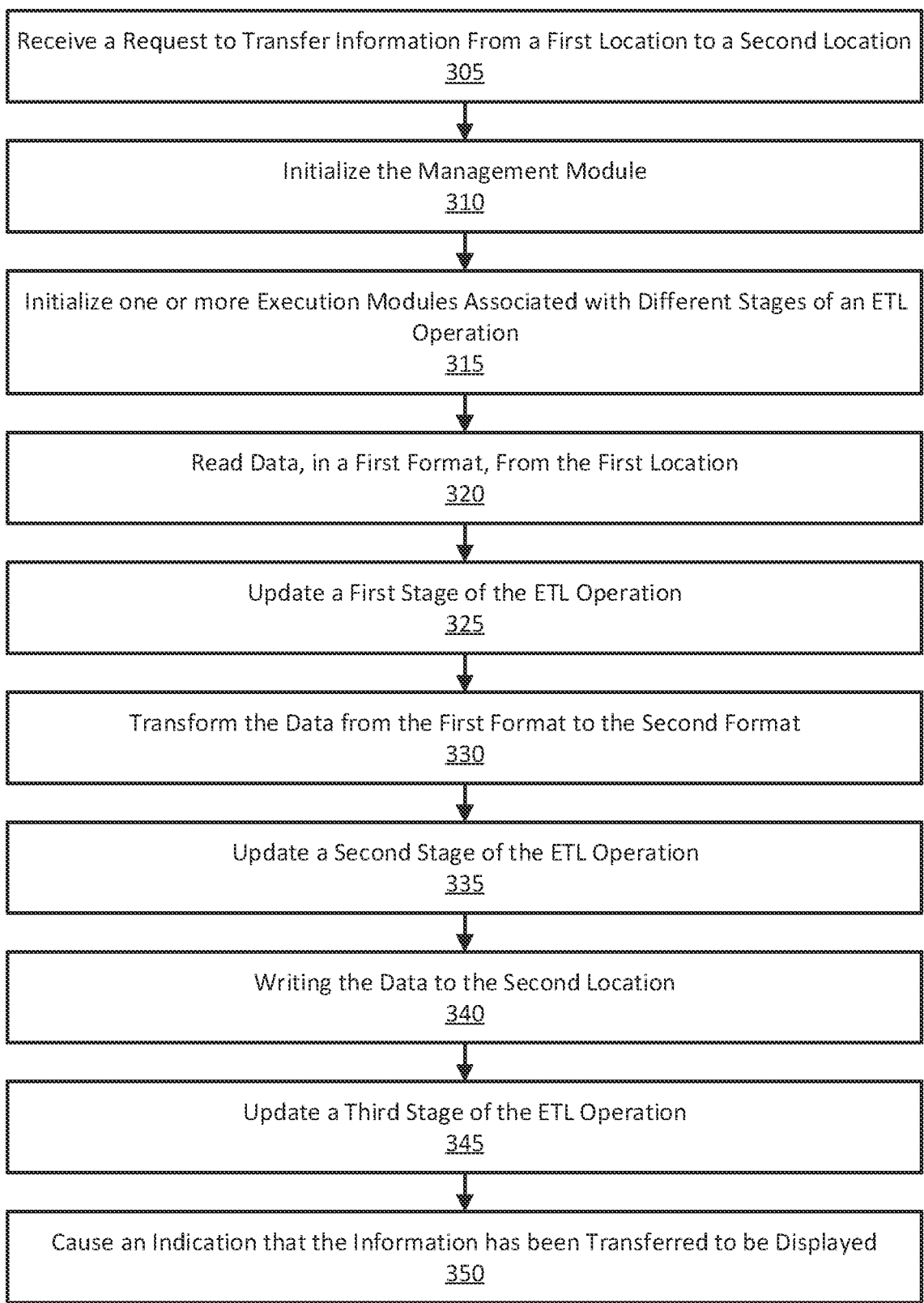

Receive a Request to Transfer Information From a First Location to a Second Location
305

Initialize the Management Module
310

Initialize one or more Execution Modules Associated with Different Stages of an ETL Operation
315

Read Data, in a First Format, From the First Location
320

Update a First Stage of the ETL Operation
325

Transform the Data from the First Format to the Second Format
330

Update a Second Stage of the ETL Operation
335

Writing the Data to the Second Location
340

Update a Third Stage of the ETL Operation
345

Cause an Indication that the Information has been Transferred to be Displayed
350

MODULAR EXECUTION AND MANAGEMENT OF EXTRACT, TRANSFORM, LOAD (ETL) PROCESSES

FIELD OF THE INVENTION

Aspects of the disclosure generally relate to database operations and, more specifically, to extract, transform, and load (ETL) operations. Aspects of the disclosure further relate to modularization, management, and status logging for ETL operations.

BACKGROUND OF THE INVENTION

Extract, transform, and load (ETL) operations are commonly used across many industries for data management purposes, e.g., conversions from one data management system to another, performing complex operations on data spread across multiple databases and instances, partitioning data across multiple servers, and more. Depending on the source data, business ETL operations may be required to extract, transform, and load millions of data points from multiple different data sources.

Due to the complexity and size of these ETL operations, it is crucial for businesses and ETL engineers to be able to manage, validate, and scale individual stages within an ETL operation. It is also crucial for ETL engineers running an ETL operation to be able to receive status and error updates in the ETL operation, and furthermore, to be able to track the speed of the ETL stage to target inefficient operations.

SUMMARY OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may relate to managing extract, transform, and load (ETL) operations. Aspects described herein may further relate to modularization and management of a plurality of stages of an ETL operation, configuration parameters for each stage of an ETL operation, and pre-execution validation procedures of configuration parameters for each stage of an ETL operation. Aspects described herein may further relate to execution of extract stages within an ETL operation across multiple data sources, execution of transform stages within an ETL operation against extracted data, and execution of load stages within an ETL operation with respect to the transformed data. Aspects described herein may further relate to discrete logging across the ETL stages and performing timing operations across the ETL stages.

For instance, a computer-implemented method may comprise receiving a request to transfer information from a plurality of databases to a data warehouse and initializing, based on a plurality of configuration parameters, a management module configured to coordinate execution of a plurality of stages of an extract, transform, load (ETL) operation from the plurality of databases to the data warehouse. The management module may initialize an execution module associated with each stage of the plurality of stages. The first execution module may read data, in a first format, from a first database of the plurality of databases and may update, by the management module and based on a determination that the data has been read from the first database, a stage of the ETL operation indicating that the data has been read. The second execution module may transform, based on the stage of the ETL operation indicating that the data has been read, the data to a second format, and may then update, by the management module and based on a determination that the data has been transformed, the stage of the ETL operation to indicate that the data has been transformed. The third execution module may write, based on the stage of the ETL operation indicating that the data has been transformed, the data to the data warehouse, and may then update, by the management module and based on a determination that the data has been written to the data warehouse, the stage of the ETL operation to indicate completion of the ETL operation. Finally, the management module may cause, based on the stage of the ETL operation indicating completion of the ETL operation, an indication that the information has been transferred from the plurality of databases to the data warehouse to be displayed.

Initializing the management module may further comprise determining, by the management module, that the plurality of configuration parameters is valid. Similarly, initializing the execution module associated with each stage in the plurality of ETL stages may further comprise determining, by the execution module, that a subset of the plurality of configuration parameters for the execution module associated with each stage of the plurality of stages is valid. This method of initializing the execution module may further comprise, based on a determination that a first configuration parameter of the subset of configuration parameters is invalid, an indication of invalid configuration parameters to be displayed, and the execution module may receive, based on the indication of invalid configuration parameters and prior to execution by the execution module, a subset of valid configuration parameters, wherein the execution module is initialized based on the subset of valid configuration parameters.

The method of the execution module executing a read operation may also further comprise the execution module determining an initialization time and a completion time of a read operation and causing, based on the total execution time exceeding a threshold, an error to be displayed. Updating the stage of the ETL operation may also further comprise causing, after each execution module completes execution of a stage of the ETL operation, a status of the ETL operation to be displayed. The configuration parameters may comprise a JavaScript Object Notation (JSON) dictionary. The execution module associated with each stage of the plurality of stages may comprise a third-party program. Completion of each stage of the plurality of stages may comprise the execution module passing a temporary data structure comprising updates completed by the execution module associated with each stage of the plurality of stages to the management module.

Initializing the first execution module may further comprise incorporating, into the first execution module, a first subset of the configuration parameters from the plurality of configuration parameters, wherein the first subset of configuration parameters comprises one or more of the first data format, a location for the plurality of databases, or a first schema for a format of a first temporary data structure. The execution module may read the data from the first database, write the data into a first temporary data structure, and provide the first temporary data structure to the management module.

A computing device, comprising one or more processors and memory storing instruction that, when executed by the device, may cause the device to receive a request to transfer information from a plurality of databases to a data warehouse and initialize, based on a plurality of configuration parameters, a management module configured to coordinate execution of a plurality of stages of an extract, transform, load (ETL) operation from the plurality of databases to the data warehouse. The instructions, when executed by one or more processors of the device, may then cause the device to initialize, by the management module, an execution module associated with each stage of the plurality of stages. The instructions, when executed by one or more processors of the device, may then cause the device to read, using a first execution module, data, in a first format, from a first database of the plurality of databases and then cause the management module to update, based on a determination that the data has been read from the first database, a stage of the ETL operation indicating that the database has been read. The second execution module may then transform the data to a second format based on the stage of the ETL operation indicating that the database has been read and updated, by the management module and based on a determination that the data has been transformed, the stage of the ETL operation to indicate that the data has been transformed. The third execution module may then write, based on the stage of the ETL operation indicating that the data has been transformed, the data to the data warehouse; the management module may then update the stage of the ETL operation, based on a determination that the data has been written to the data warehouse and cause, based on the stage of the ETL operation indicating completion of the ETL operation, an indication that the information has been transferred from the plurality of databases to the data warehouse to be displayed.

The computing device, when the one or more processors execute the instructions stored in memory, may incorporate a second subset of the configuration parameters from the plurality of configuration parameters into the second execution module, wherein the second subset of configuration variables comprises at least one of a first temporary data structure, a second temporary data structure, or an executable statement to modify the data in the first temporary data structure. The instructions may also further cause the computing device to execute the executable statement to modify the data in the first temporary data structure. The executable statement may comprise a Structured Query Language (SQL) statement.

One or more transitory computer-readable media storing instructions that, when executed by one or more processors, may cause a computing device to receive a request to transfer information from a plurality of databases to a data warehouse; initialize, based on a plurality of configuration parameters, a management module configured to coordinate execution of a plurality of stages of an extract, transform, load (ETL) operation from the plurality of databases to the data warehouse; and initialize, by the management module, an execution module associated with each stage of the plurality of stages. The instructions, when executed, may further cause a first execution module to read data, in a first format, from a first database of the plurality of databases and the management module to update, based on a determination that the data has been read from the first database, a stage of the ETL operation indicating that the data has been read. The instructions, when executed, may further cause a second execution module to transform, based on the stage of the ETL operation indicating that the data been read, the data to a second format and cause the management module to update, based on a determination that the data has been transformed, the stage of the ETL operation to indicate that the data has been transformed. The instructions, when executed, may further cause a third execution module to write, based on the stage of the ETL operation indicating that the data has been transformed, the data to the data warehouse; may cause the management module to update, based on a determination that the data has been written to the data warehouse, the stage of the ETL operation to indicate completion of the ETL operation; and finally, may cause the management module to, based on the stage of the ETL operation indicating completion of the ETL operation, cause an indication that the information has been transferred from the plurality of databases to the data warehouse to be displayed.

The one or more non-transitory computer readable-media, wherein the instructions, when executed by the one or more processors, may cause the computing device to initialize the third execution module by incorporating a third subset of configuration parameters from the plurality of configuration parameters into the third execution module, wherein the third subset of configuration parameters comprises at least one of a plurality of output locations, an output file format, or a partition configuration setting. The executed instructions may further cause a computing device to determine, using the partition configuration setting, a destination within the plurality of output locations and write the data to that destination.

The one or more non-transitory computer readable-media, wherein the instructions, when executed by the one or more processors, may cause the computing device to initialize an execution module associated with each stage by determining, by the execution module, that a subset of the plurality of configuration parameters for the execution module associated with each stage of the plurality of stages is valid. The instructions, when executed, may also cause the computing device to perform steps which may comprise causing, based on a determination that a first configuration parameter of the subset of configuration parameters is invalid, an indication of invalid configuration parameters to be displayed and receiving, based on the indication of invalid configuration parameters and prior to execution of the stage associated with the execution module, a subset of valid configuration parameters, wherein the execution module associated with each stage is initialized based on the subset of valid configuration parameters.

These features, along with many others, are discussed in greater detail below.

BRIEF DESCRIPTION OF DRAWINGS

The present disclosure is illustrated by way of example and not limited in the accompanying figures in which like reference numerals indicate similar elements and in which:

FIG. 3 shows an example of a process for initializing and executing each stage of an ETL operation;

DETAILED DESCRIPTION OF THE INVENTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Aspects described herein include a method for organizing, validating, and executing stages of an extract, transform, and load ("ETL") operation. Aspects described provide for improved logging processes across each stage of an ETL operation, allowing for more discrete error logging and making it easier for a user to identify the cause of an error. Aspects also provide for logging from each stage of an ETL operation, allowing a user to target the specific stage in which the error is occurring. Aspects described also allow a user to manage all configuration parameters for each stage of an ETL operation from the same location, improving the ability to update global configuration parameters. Aspects described also further improve on ETL operations by providing pre-execution validation of configuration parameters, allowing potential errors to be discovered and corrected before execution of an improperly configured ETL operation. Aspects described also include a method for modularization of each stage in an ETL operation, providing for improvements to query management and status tracking across each stage in the ETL operation. Furthermore, aspects described may incorporate third-party data processing and ETL frameworks, allowing a user to maintain the benefits discussed above while simultaneously achieving the benefits of specialized third-party data processing and ETL frameworks.

Figure 1A:
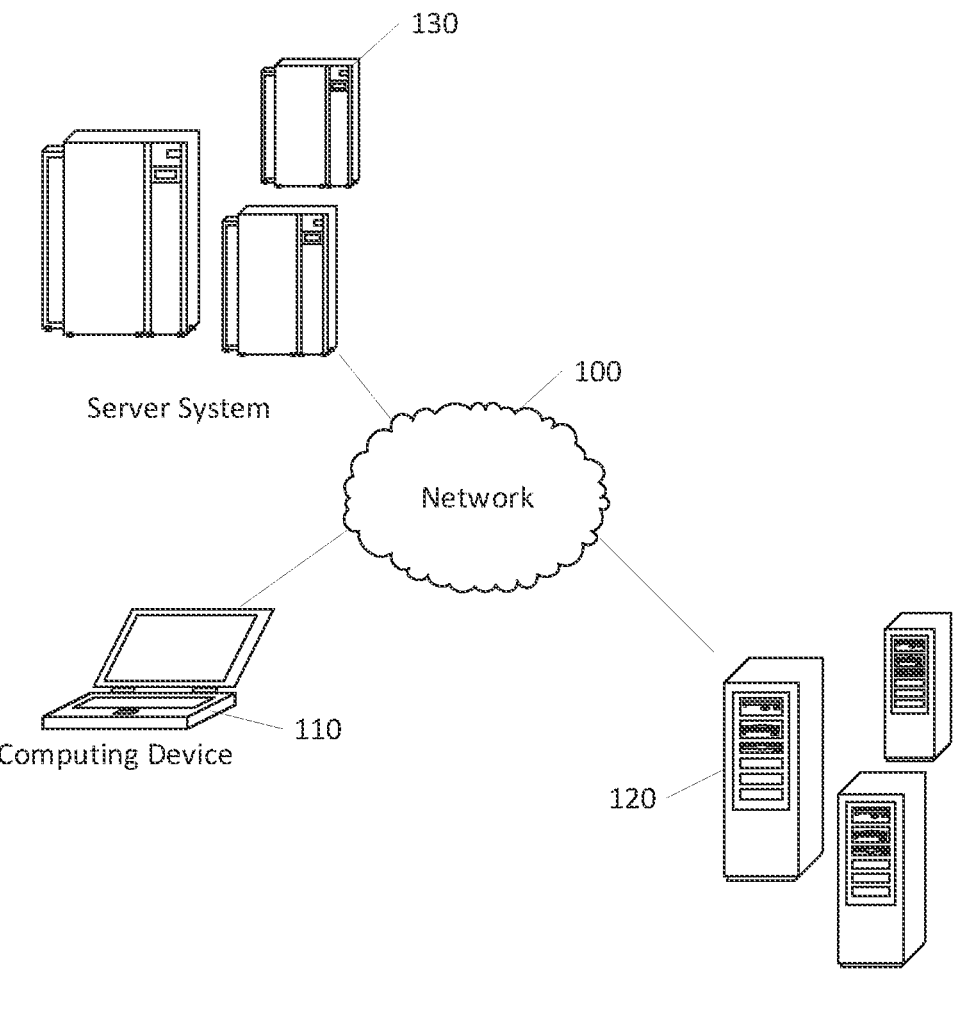
FIG. 1A shows an example of a control processing system in which one or more aspects described herein may be implemented.

FIG. 1A shows a system 100. The system 100 may include at least one database system 120, and/or at least one server system 130 in communication via a network 100. It will be appreciated that the network connections shown are illustrative and any means of establishing a communications link between the computers may be used. The existence of any of various network protocols, such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Database system 120 may be configured to maintain, store, retrieve, and update information for server system 130. Further, database system 120 may provide server system 130 with information periodically or upon request. In this regard, database system 120 may be a distributed database capable of storing and computing large volumes of data across clusters of nodes. Database 120 may include, but are not limited to relational databases, hierarchical databases, distributed databases, in-memory databases, flat file databases, XML databases, NoSQL databases, graph databases, and/or a combination thereof.

Server system 130 may be configured with a server application (not shown) that is capable of interfacing with computing device 110 and database system 120 as described herein. In this regard, server system 130 may be a standalone server, a corporate server, or a server located in a server farm or cloud-computer environment. According to some examples, server system 130 may be a virtual server hosted on hardware capable of supporting a plurality of virtual servers.

Network 100 may include any type of network. For example, network 100 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 1B:
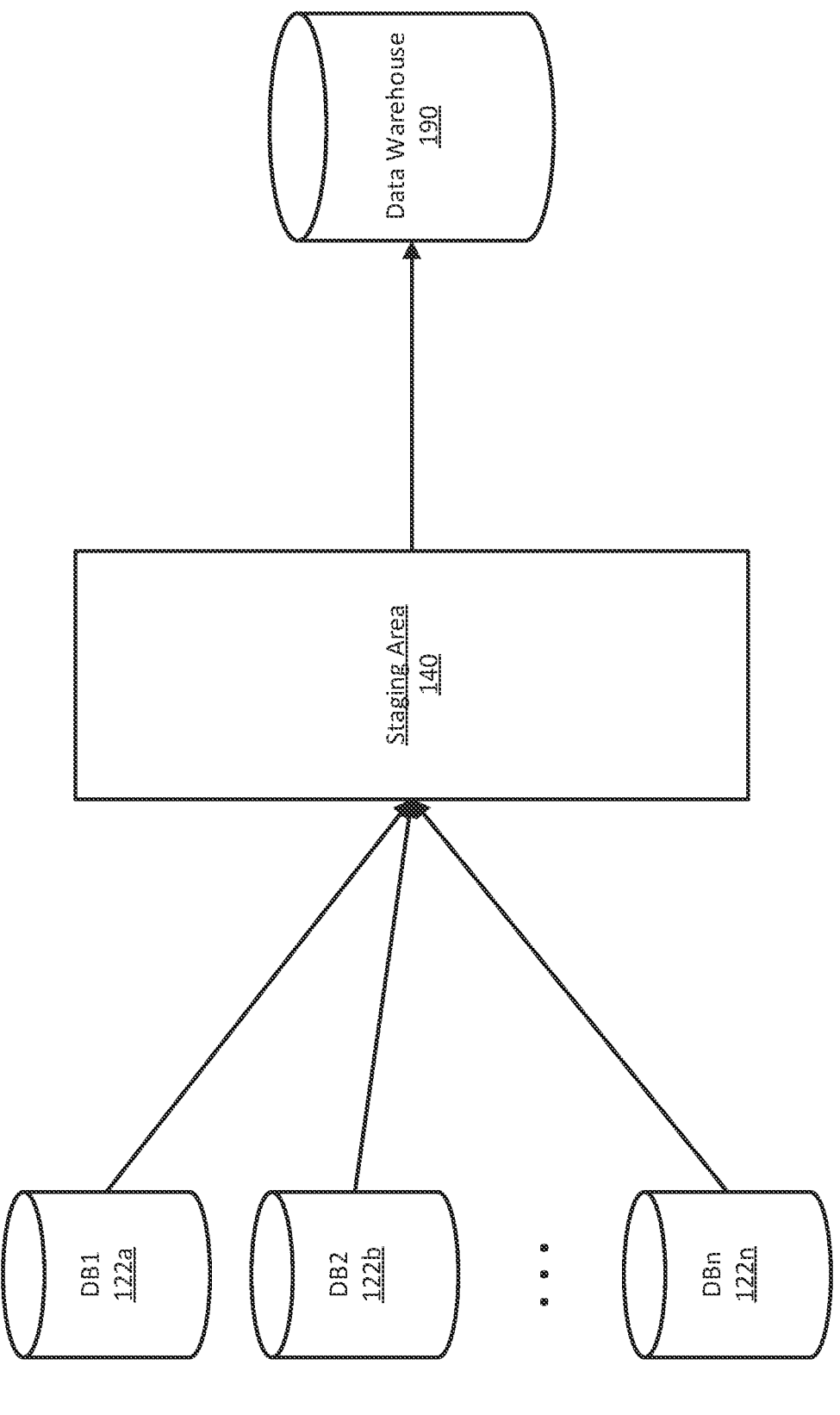
FIG. 1B shows an example of an extract, load, and transform (ETL) operation.

FIG. 1B shows a system by which an ETL operation may be enacted. As shown, the system may comprise one or more source locations (e.g., DB1 122*a*, DB2 122*b*, and/or DBn 122*n*), a staging area 140, and a target location (e.g., data warehouse 190). The one or more source locations may be any storage device capable of storing data and/or information, including, for example, databases (e.g., DB1 122*a*, DB2 122*b*, and/or DBn 122*n*), data warehouses, data lakes, and the like. Staging area 140 may be part of the target location, such as data warehouse 190. In other embodiments, staging area 140 may be an independent location separate from the target location (e.g., data warehouse 190). In some instances staging area 140 may be connected to the one or more source locations (e.g., DB1 122*a*, DB2 122*b*, and/or DBn 122*n*) and/or the target location (e.g., data warehouse 190) via a network (not shown), similar to network 100 discussed above in FIG. 1A. In other embodiments, staging area 140 may not be necessary for the ETL operation and not used. The target location may be one or more storage devices capable of storing data and/or information, including, for example, databases, data warehouses, data lakes, and the like. As shown in FIG. 1A, the target location is data warehouse 190.

An ETL operation may comprise three standard stage types, known as the "extract" or "read", "transform", and "load" or "write" stages. A basic ETL operation may comprise one read operation, one transform operation, and one load operation; however, more complex ETL operations may comprise additional operations of one or more stage types. For example, an ETL operation may extract data and/or information from a plurality of source locations. Such an ETL operation may be considered to have multiple read operations, wherein each read operation may comprise reading from one of the plurality of source locations; similar rationales may apply to transform operations and write operations.

An ETL operation may also be an "ELT" operation; in these instances, a basic ELT operation follows the order of read operation, then load operation, then transform operation. While an ELT-style operation may be appropriate depending on the needs of a given transaction, it will be appreciated that the same technologies and techniques may apply to either ETL or ELT operations. For purposes of this specification, ETL operation will be used.

First, in the "extract" or "read" stage, data may be "read" from a source location. The source location may be any storage device capable of storing data and/or information, including, for example, databases such as DB1 122*a*, DB2 122*b*, and/or DBn 122*n*, data warehouses, data lakes, and the like. Databases (e.g., DB1 122*a*, DB2 122*b*, and/or DBn 122*n*) may be any of the databases described above in reference to the one or more database systems 120 in FIG. 1A. Databases (e.g., DB1 122*a*, DB2 122*b*, and/or DBn 122*n*) may comprise data storage of one or more different types, including, but not limited to, relational databases, non-relational databases, data serialized files, and/or other data storage systems. Instructions may be provided to a computing device, akin to the computing device 110 in FIG. 1A, to connect to DB1 122*a*, DB1 122*b*, and/or DBn 122*n* and, by the instructions, locate the data to be extracted from the DB1 122*a*, DB2 122*b*, and/or DBn 122*n*.

The computing device may execute a query statement to locate the desired data in the one or more databases (e.g., DB1 122*a*, DB2 122*b*, and/or DBn 122*n*). In some embodiments, the query statement may be a Structured Query Language (SQL) query. It will be appreciated that a query statement for reading data from the databases (e.g., DB1 122*a*, DB2 122*b*, and/or DBn 122*n*) may take a variety of forms, including, but not limited to, SQL, standardized methods for parsing a serialized data formats, such as CSV and the like, executable statements written in computing languages, such as Python and the like, and more.

A "read operation" may comprise querying, via the computing device and by the provided query statement, one or more databases (e.g., DB1 122*a*, DB2 122*b*, and/or DBn 122*n*) for the desired data. The computing device may then copy or save the queried data into a temporary data structure at a staging area 140. A "read operation" may also comprise retrieving, per an executable statement, a data serialized file containing the desired data. The computing device may parse the data serialized file into a temporary data structure at a staging area 140.

In the second stage, the "transform" stage the extracted data may be processed. As noted above, the data may be extracted (e.g., read) from the one or more source locations (e.g., DB1 122*a*, DB2 122*b*, and/or DBn 122*n*). Processing the data may comprise transforming the data while the data is temporarily stored in staging area 140. In another embodiment, processing the data may comprise a lazy transformation, with the transformation process only completed at the time that a load operation for a particular piece of data is triggered.

In some embodiments, a "transform operation" in the transform stage may comprise data cleaning. Cleaning transformations may comprise removing unwanted data or converting wanted data from a source data format to a destination data format. In other embodiments, a "transform operation" may comprise updating extracted data or calculating a new set of data based on the extracted data, where the newly calculated data is to be stored in the target location (e.g., data warehouse 190). Other embodiments may comprise additional, repeated transformation stages to further clean or calculate new data until the desired data has been obtained.

In one embodiment, the instructions to transform the extracted (e.g., read) data may comprise a database query language, such as SQL or SQL-compatible languages, like MySQL or PostGreSQL. The database statements may be executable to update or generate a table or column of data. In another embodiment, the instructions may comprise an operation written in a computing language, such as Python, C#, Perl, and/or others.

In the third stages, the "load" or "write" stage, the transformed data is written to a target location (e.g., data warehouse 190). The target location (e.g., data warehouse 190) may be a database management system optimized for long-term data maintenance and/or data analysis. Additionally or alternatively, target location (e.g., data warehouse 190) may be similar to database system 120 or server system 130 discussed above in FIG. 1A. Additionally or alternatively, the target location (e.g., data warehouse 190) may be similar to computing device 110 discussed above with respect to FIG. 1A. In some instances, the target location (e.g., data warehouse 190) may be a distributed database connected by network 100, where writing to the target location (e.g., data warehouse 190) may further comprise partitioning data into different partitions of the target location (e.g., data warehouse 190) according to a provided set of instructions. The load operation may write a data serialized file with the transformed data. In some instances, the target location may comprise a storage area network (SAN).

An ETL operation may have one or more destination locations, each of which may be one of the types described above.

A "load operation" or "write operation" may comprise an executable statement that, when executed, directs a computing device to update or insert the transformed data into one or more target locations (e.g., data warehouse 190). An ETL operation may comprise multiple load operations across multiple tables and/or destinations, wherein a single load operation may refer to updating or creating a single table in a single location. In some instances, a "load operation" or "write operation" may comprise an executable statement that, when executed, writes the transformed data into a data serialized format.

It will be appreciated that an ETL operation may be scaled along different aspects of the ETL operation; for example, but not limited to, multiple source databases, multiple transform operations, and/or multiple destination locations. Further variations on an ETL operation may also comprise operations involving "Big Data," which may have a plurality of records distributed source or destination data systems, ongoing data transfers, one-time conversions, and/or other complications. Each of these potential complications may lead to modifications on the basic ETL operation to optimize and complete the entire operation.

Figure 2:
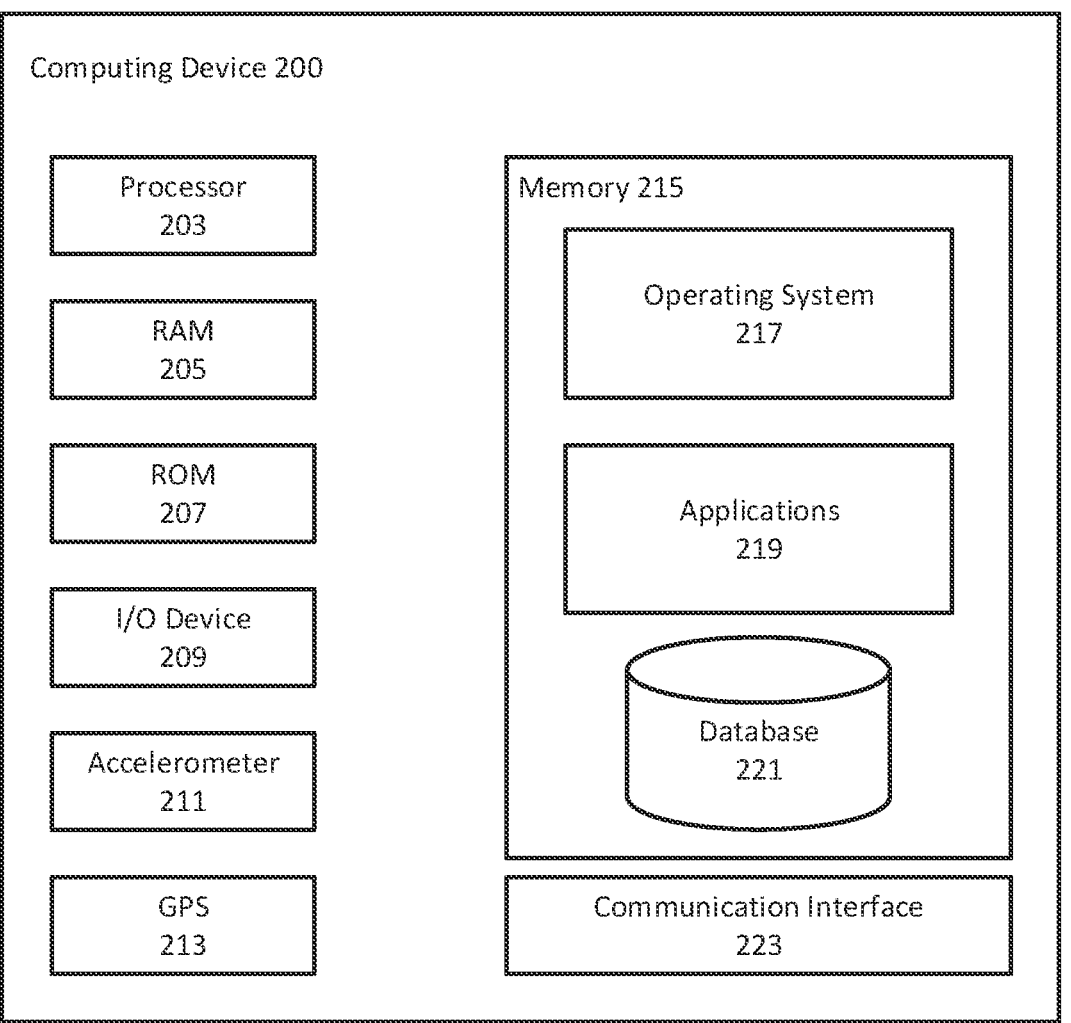
FIG. 2 shows an example of a computing device in accordance with one or more aspects of the disclosure.

Any of the devices and systems described herein may be implemented, in whole or in part, using one or more computing devices described with respect to FIG. 2. Turning now to FIG. 2, a computing device 200 that may be used with one or more of the computational systems is described. The computing device 200 may comprise a processor 203 for controlling overall operation of the computing device 200 and its associated components, including RAM 205, ROM 207, input/output device 209, accelerometer 211, global-position system antenna 213, memory 215, and/or communication interface 223. A bus 202 may interconnect processor(s) 203, RAM 205, ROM 207, memory 215, I/O device 209, accelerometer 211, global-position system receiver/antenna 213, memory 215, and/or communication interface 223. Computing device 200 may represent, be incorporated in, and/or comprise various devices such as a desktop computer, a computer server, a gateway, a mobile device, such as a laptop computer, a tablet computer, a smart phone, any other types of mobile computing devices, and the like, and/or any other type of data processing device.

Input/output (I/O) device 209 may comprise a microphone, keypad, touch screen, and/or stylus through which a user of the computing device 200 may provide input, and may also comprise one or more speakers for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may comprise volatile and nonvolatile, removable and non-removable media implemented in any method or technology for storage of information such as computer-readable instructions, data structures, program modules, or other data. Memory 215 may comprise one or more physical persistent memory devices and/or one or more non-persistent memory devices. Memory 215 may comprise random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer 211 may be used to measure the tilting motion and/or orientation of computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user.

Communication interface 223 may comprise one or more transceivers, digital signal processors, and/or additional circuitry and software, protocol stack, and/or network stack for communicating via any network, wired or wireless, using any protocol as described herein.

Processor 203 may comprise a single central processing unit (CPU), which may be a single-core or multi-core processor, or may comprise multiple CPUs. Processor(s) 203 and associated components may allow the computing device 200 to execute a series of computer-readable instructions (e.g., instructions stored in RAM 205, ROM 207, memory 215, and/or other memory of computing device 215, and/or in other memory) to perform some or all of the processes described herein. Although not shown in FIG. 2, various elements within memory 215 or other components in computing device 200, may comprise one or more caches, for example, CPU caches used by the processor 203, page caches used by the operating system 217, disk caches of a hard drive, and/or database caches used to cache content from database 221. A CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the disclosure.

Aspects described herein comprise a method and apparatus for organizing, initializing, and executing an ETL operation across multiple modules. FIG. 3 shows a flow chart of a process for initializing and executing an ETL operation according to one or more aspects of the disclosure. Some or all of the steps of process 300 may be performed using one or more computing devices as described herein, including, for example, the computing device 110, the server 130, the computing device 200, or any combination thereof. Some or all steps of process 300 may further be performed using one or more databases and data storage locations as described herein, including, for example, one or more source databases (e.g., DB1 122a, DB2 122b, and/or DBn 122n), staging area 140, and/or one or more target locations (e.g., data warehouse 190).

In step 305, a computing device may receive a request to transfer information from a first location to a second location. The request to transfer information may comprise an automated ETL operation. The first location may comprise one or more first databases (e.g., DB1 122a, DB2 122b, and/or DBn 122n) as shown in FIG. 1B. The second location may comprise one or more second databases, such as data warehouse 190 as shown in FIG. 1B. Additionally or alternatively, the second location may comprise one or more data lakes, data warehouses, data serialized files, and the like.

In step 310, the computing device may initialize, based on a plurality of configuration parameters, a management module configured to coordinate execution of a plurality of stages of an extract, transform, load (ETL) operation from the plurality of databases (e.g., DB1 122a, DB2 122b, and/or DBn 122n) to a data warehouse, such as data warehouse 190. The management module may receive a set of configuration parameters by which the management module may be configured. In some embodiments, the set of configuration parameters may additionally comprise configuration parameters for the execution modules associated with each stage of an ETL operation.

In step 315, the computing device may initialize, via the management module, an execution module associated with each stage of the ETL operation. In some embodiments, the management module may use a subset of the configuration parameters to initialize an execution module. In other embodiments, configuration parameters for an execution module may be provided from the computing device to the execution module upon initialization of the execution. For example, configuration parameters may be provided to the execution module as in-line parameters provided by a user operating the computing device. Each execution module may be initialized with a parameter indicating the corresponding ETL stage; for example, a first execution corresponding to an extract (e.g., read) stage of an ETL operation may contain a parameter indicating a "read" stage type.

Additionally or alternatively, the management module may initialize one or more execution modules for each stage of the ETL operation. For example, the management module may initialize a first execution module corresponding to an extract, or read, stage of the ETL operation, a second execution module corresponding to a transform stage of the ETL operation, and/or a third execution module corresponding to a load (e.g., write) stage of an ETL operation.

In step 320, the computing device may extract (e.g., read) a first data, in a first format, from a first source location. The first source location may be a first source location of a plurality of source locations. The first source location may be similar to the one or more data sources (e.g., DB1 122a, DB2 122b, and/or DBn 122n) shown in FIG. 1A. Alternatively, the first source location may be one or more of any computer data storage devices, such as database system 120, computing device 200, or others. The first format may comprise a schema or database language, such as SQL. The first format may define one or more methods of encoding data. For example, read data may include abbreviations or shorthand notation, such as "M" for "male" and "F" for "female."

As noted above, the extract operation may be performed by one or more execution modules. Each of the one or more execution modules may read data from a different source location. For example, a first read execution module may read from a first database (e.g., DB1 122a), a second read execution module may read from a second database (e.g., DB2 122b), and an nth read execution module may read from a third database (e.g., DBn 122n). Alternatively, a single read execution module may be configured to read from a plurality of source locations (e.g., DB1 122a, DB2 122b, and/or DBn 122n).

As part of the extract operation, a first execution module may locate the first data by querying the one or more source locations using a query statement, such as a SQL query or the like. The query statement may be included in the configuration parameters used to initialize the management module. The set of instructions may be passed from the management module to the first execution module upon initialization of the first execution module. Additionally or alternatively, the set of instructions may be provided to the first execution module upon initialization of the execution module. After the first data is located, the first data may be extracted from the one or more source locations and stored in a temporary data structure. Additionally or alternatively, the first source location may correspond to a data serialized file, such as a CSV file or the like. The first execution module may access the data serialized file, parse the first data in the file via standard parsing methods, and store the parsed (e.g., read) data in the temporary data structure.

"Temporary data structure," as used herein, may refer to temporary data storage used to store data in between extracting/reading and loading/writing. Using a temporary data structure provides for faster processing by the remaining ETL stages and prevents any unintended modifications to the data stored in the first location and/or source database. The temporary data structure may be deleted (e.g., erased) after the ETL operation is completed.

Additionally or alternatively, the temporary data structure may be a "data frame." A "data frame" may be a two-dimensional size-mutable, heterogenous tabular data structure with labeled rows and columns. Additionally or alternatively, the temporary data structure may be similar to the "DataFrame" object implemented in the pandas toolkit, Apache Spark, R, and/or the like. Generally, "temporary data structure," as used herein, may refer to any temporary data storage that is capable of being used to communicate data from one module to the next, such as a temporary table created by a JOIN command in SQL, a cache in a staging area, a data frame as described above, and/or the like.

In step 320, the computing device (e.g., the first execution module executing on the computing device) may update a status associated with a stage of an ETL operation. Updating the status of the read operation may comprise determining, by the first execution module, that the first data has been extracted from the first source location and that all of the first data has been loaded into a staging area 140. The first execution module may cause an update to be displayed regarding the status of the ETL operation. The update may be written to and/or displayed in a status log accessible by a user via a computing device. The first execution module may determine an initialization time of a read operation; determine a completion time of the read operation; and cause, based on a determination that an execution time of the read operation exceeded a threshold, an error to be displayed. The first execution module may cause the initialization time of a read operation to be displayed and further cause a completion time of a read operation to be displayed. The first execution module may cause a display of the initialization time to be displayed before extracting the first data from the first data location, and may cause a display of a completion time to be displayed after extraction of the first data from the first data location is completed.

In step 325, the computing device may update, via the management module and based on a determination that the data has been read from the first location, a status of the ETL operation. The updated status may indicate that the data has been read. The status information may comprise one or more of a start time of the read operation, a completion time of the read operation, and/or a status (e.g., success, failure, error, etc.) of the read operation. The management module may cause, after each execution module completes execution of a stage of the ETL operation, the status of the ETL operation to be written to and/or displayed in a log entry.

In step 330, the computing device (e.g., a second execution module executing on the computing device) may transform the first data from a first format to a second format. The transformation may be based on the stage of the ETL operation indicating that the data has been read. The second execution module, like the first execution module, may be initialized based on a subset of configuration parameters; these parameters will be discussed further with respect to the transform module in FIG. 4.

The second format may be a different data schema from the first format. For example, the first data format may be CSV and the second data format may be SQL. The second data format may also represent a new set of values, to be calculated based on the source data and a set of calculation instructions. For example, based on a source data set indicating sales of a product per day, the second data format may be sales of the product per month, with a set of instructions providing the logic for converting (e.g., aggregating) the source data from the first format into the second format. It will be appreciated that a plurality of transform operations may be used to convert the data from a first format to a second format, for example, based on the desired output of a given ETL operation.

The second execution module may retrieve the first data in a first format from the first temporary data structure. The first temporary data structure may have been prepared by the first execution module during the read operation. The second execution module may execute an executable statement to transform (e.g., modify) the data from the first format to the second format. The executable statement may refer to a set of instructions for the desired transformation of the first data. The instructions may be written in source code, such as Python, C++, R, or others. Additionally or alternatively, the instructions may be written as a database query statement, such as a SQL-compatible statement, which generates a second data or modifies the first data. The transformed (e.g., second) data may be stored in a second temporary data structure. In some embodiments, the first and second temporary data structures may be the same. The second temporary data structure may be used to pass the transformed data to the next execution module.

Similar to the first execution module, the second execution module may determine the initialization time of the transform operation and the completion time of the transform operation. The second execution module may cause the initialization time and the completion time of the transform operation to be displayed. Additionally or alternatively, the initialization and completion time of the transform operation may be written to and/or displayed in a log entry. The second execution module may cause an error to be displayed, for example, based on the time elapsed between the initialization time and the completion time exceeding a threshold.

In step 335, the management module may update the status of the ETL operation to indicate that the data has been transformed, for example, based on a determination that the data has been transformed. The updated status may indicate that the data has been transformed. The status information may comprise one or more of a start time of the transform operation, a completion time of the transform operation, and/or a status (e.g., success, failure, error, etc.) of the transform operation. The management module may cause, after each execution module completes execution of a stage of the ETL operation, the status of the ETL operation to be written to and/or displayed in a log entry.

In step 340, the computing device (e.g., a third execution module executing on the computing device) may write the transformed data to a second location, for example, based on the status of the ETL operation indicating that the data has been transformed. The third execution module may receive the second temporary data structure. The second temporary data structure may comprise the transformed data that is to be written to the second location. Upon receiving the second temporary data structure, the third execution module may write (e.g., load) the transformed data to the second location. Similar to the first and second execution module, the third execution module may additionally be initialized with configuration parameters, which will be discussed further with respect to the writer module in FIG. 4.

Based on the configuration parameters, the third execution module may determine the second location and/or method of writing or loading the transformed data. The second location may be a data warehouse or a table in a data warehouse (e.g., data warehouse 190 in FIG. 1B). Additionally or alternatively, the second location may be one or more database systems (e.g., database systems 120 in FIG. 1A). Additionally or alternatively, the second location may be a file location to which the third execution module writes and saves a data serialized file comprising the data in the second temporary data structure. The third execution module may write the transformed data in the second temporary data structure to the second location.

Similar to the read and transform stages of the ETL operation, the third execution module may determine an initialization time of the write (e.g., load) operation and/or a completion time of the write operation. The third execution module may cause the initialization and/or completion times to be written to and/or displayed in a log. The third execution module may cause an error to be written to and/or displayed in a log, for example, based on determining that the elapsed time between initialization and completion of the write operation exceeds a threshold.

In step 345, the management module may update the status of the ETL operation to indicate completion of the ETL operation, for example, based on a determination that the data has been loaded (e.g., written) to the data warehouse. The updated status may indicate that the data has been loaded (e.g., written). The status information may comprise one or more of a start time of the write operation, a completion time of the write operation, and/or a status (e.g., success, failure, error, etc.) of the write operation. The management module may cause, after each execution module completes execution of a stage of the ETL operation, the status of the ETL operation to be written to and/or displayed in a log entry.

In step 350, the management module may cause an indication that the information has been transferred from the plurality of databases to the data warehouse to be displayed. The indication may be displayed based on an indication that the ETL operation has completed. The indication may be written to and/or displayed in a status log. Additionally or alternatively, the indication may comprise a notification sent to a user indicating that the ETL operation has been completed. The notification may be an electronic communication, such as an email, a push notification, an alert in an application, a text message, etc.

Figure 4:
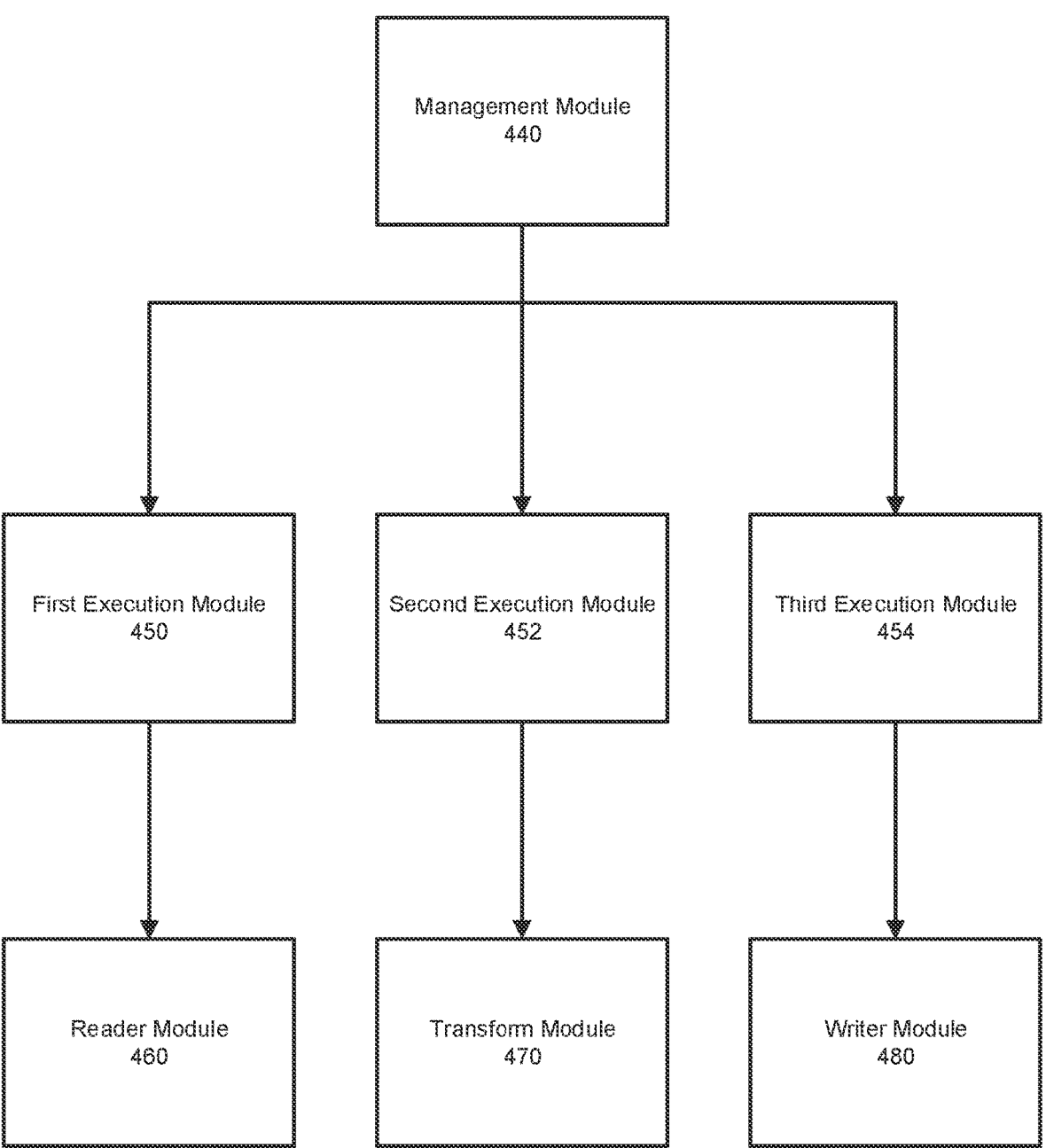
FIG. 4 shows an example of how software for initializing and executing each stage of an ETL operation may be organized.

With regards to the process for managing ETL stages and execution of the ETL stages, the management and execution modules may be organized in such a way as to facilitate the ETL operation. FIG. 4 shows a flow chart of an organization of the management and execution modules for an ETL operation. It may be appreciated that FIG. 4 represents one possible arrangement of the modules for carrying out a process similar to that described in FIG. 3. It may also be appreciated that different ETL operations may lead to the use of a plurality of execution modules per ETL stage.

Management module 440 may manage (e.g., orchestrate) the execution of the extract (e.g., read), transform, and load (e.g., write) stages of the ETL operation. Management module 440 may be initialized with a plurality of configuration parameters. The plurality of configuration parameters may comprise one or more of a third-party data processing instance, a third-party ETL instance, a third-party logging instance, management-level configuration parameters, and/or subsets of configuration parameters to be incorporated into execution modules. A first third-party instance may also comprise a combination of one or more of the third-party data processing, ETL, and/or logging instances. Each execution module (e.g., first execution module 450, second execution module 452, third execution module 454) may execute the data processing, ETL, and/or logging operations via the methods provided by the one or more third-party instances. Example third-party instances comprising one or more of data processing, ETL, and/or logging instances may include Apache Spark, Hadoop, Tableau, or others.

A third-party data processing instance may be initialized or used with management module 440 to directly execute data processing methods. Initializing management module 440 with a third-party data processing module may provide the ability to incorporate modern computing technologies into the individual stages, such as, but not limited to, scaling data processing techniques over a plurality of data, while maintaining the benefit of modular stages encompassing discrete operations.

A third-party ETL instance may be initialized or used with management module 440 to directly execute ETL methods. Initializing management module 440 with a third-party ETL instance may allow for incorporation of modern or specialized ETL techniques, such as, but not limited to, scaling ETL techniques over a plurality of data or source locations, while maintaining the benefit of modular stages encompassing discrete operations.

A third-party logging instance may be initialized or used with management module 440 to provide logging services. Example third-party logging modules comprising a logging instance may include Log4J, Python Logger, and/or others. Additionally or alternatively, the third-party logging instance may be a third-party logging instance which may be compatible with the third-party data processing and/or ETL instance. Initializing management module 440 with a third-party logging instance allows a user to incorporate modern logging techniques across the different stages of the ETL operation, achieving more discrete logging for each read, transform, and/or write operation.

As noted above, management module 440 may be initialized with a plurality of management configuration parameters, which may be global parameters that may be applicable to each stage of the ETL operation. Individual execution modules may, either in a corresponding subset of configuration parameters or individually, receive execution module-level configuration parameters which may override global configuration parameters from management module 440. Management configuration parameters may be in the form of a JavaScript Object Notation (JSON) dictionary. Additionally or alternatively, management module 440 may also be configured to cause the display of the data read, transformed, and/or written by that execution module, for example, after successful completion of each execution module. This may allow for improved debugging with fewer configuration steps.

The plurality of configuration parameters may further comprise subsets of configuration parameters for each individual execution module in the ETL operation. The subsets of configuration parameters may allow a user to configure and/or execute an ETL operation from only one place rather than require the configuration of each stage independently. One set of configuration parameters may also ensure that any changes to the configuration parameters are propagated to all of the relevant stages, making parameters for all stages easier to update and maintain. The configuration parameters may be in the form of a JSON dictionary.

Upon initialization, management module 440 may initialize all of the execution modules specified in the configuration parameters, with one example of the execution modules represented in FIG. 4 as first execution module 450, second execution module 452, and third execution module 454. Based on the configuration parameters, the management module 440 may initialize further execution modules (not shown) to execute different transactions within the ETL operation. When a third-party data processing instance is being used, management module 440 may also provide access to the third-party data processing instance to the execution modules. Additionally or alternatively, when a third-party ETL instance is being used, management module 440 may also provide access to the third-party ETL instance to the execution modules. Additionally or alternatively, when a third-party logging instance is being used, management module 440 may also provide access to the third-party logging instance to the execution modules. By providing the execution modules with access to the third-party data processing instance and/or the third-party logging instance, management module 440 may simplify configuration of the execution modules instead of requiring a user to manage the configuration and/or permissions of the execution modules at each stage. Management module 440 may also run a validity check for the plurality of configuration parameters corresponding to all of the execution modules for an ETL operation; this will be discussed further with respect to FIG. 5.

As shown in FIG. 4, the management module 440 initializes execution modules for each stage of an ETL operation. First execution module 450 may correspond to the extract (e.g., read) stage, second execution module 452 may correspond to the transform stage, and third execution module 454 may correspond to the load (e.g., write) stage. Each execution module may initialize an additional execution module corresponding to the stage type, for example, based on the subset of configuration parameters associated with each execution module. For instance, first execution module

450, corresponding to the extract (e.g., read) stage, may initialize a reader module 460; second execution module 452, corresponding to the transform stage, may initialize a transformer module 470; and third execution module 454, corresponding to the load (e.g., write) stage, may initialize a writer module 480. Additional execution modules corresponding to each stage may be added via the configuration parameters provided by management module 440.

Upon initialization, an execution module then further initializes a corresponding stage module based on the stage type corresponding to the execution module and defined in the corresponding subset of configuration parameters. For example, management module 440 may initialize first execution module 450 with a subset of configuration parameters indicating that first execution module 450 will execute a read operation. First execution module 450 may then initialize reader module 460, which will perform the read operation directly.

The execution modules (e.g., first execution module 450, second execution module 452, third execution module 454, etc.) may receive a set of configuration parameters from management module 440. Each subset of configuration parameters for an execution module may comprise one or more of a stage number, a stage type, a stage name, a target name, a stage description, or a second subset of configuration parameters specific to the type of stage.

A stage number parameter may indicate the order in which the execution modules will execute the respective operations. For example, first execution module 450, corresponding to a read operation, may have a stage number of "0" to ensure that the first execution module 450 executes first. The configuration parameters may allow a user to plan a plurality of operations across a plurality of modules while still controlling the order of execution. For example, a user may configure an order of execution across multiple transform operations where each transform operation builds on a prior transform operation. In another example, the stage number parameter may be used to configure reading in an additional source of data after completing a transform operation, only reading in the additional source of data once the additional source of data was necessary to the ETL operation. By indicating the order of operations using the configuration parameters, a user may be allowed to separate operations across multiple modules, thereby allowing the user to focus on simpler individual operations to improve debugging and reduce the execution time of the entire ETL operation.

Stage name and stage description parameters may allow for better organization and debugging of the execution modules (e.g., first execution module 450, second execution module 452, third execution module 454, etc.) across the ETL operation. A stage name parameter may allow a user to give each stage, and corresponding execution module, a stage name corresponding to the operation that the execution module will perform. Similarly, a stage description parameter may allow a user to provide a short explanation of the operation to be completed in that stage. The stage name and/or stage description parameters may provide for improved debugging by allowing a user to quickly understand the purpose of a given stage.

A target name parameter may determine the name of the temporary data structure in which data is stored. For example, in the case of the first execution module 450, which corresponds to a read operation, the target name parameter may determine the name of the temporary data structure that the data will be written to after being read from a source database.

Each execution module (e.g., first execution module 450, second execution module 452, third execution module 454, etc.) may also receive a subset of configuration parameters specific to each stage type from the configuration parameters passed by management module 440. These subsets of configuration parameters will be discussed in greater detail below.

As shown in FIG. 4, the first execution module 450 may initialize a reader module 460. Reader module 460 may perform the actions of a "read" stage of an ETL operation. Reader module 460, as triggered by first execution module 450, may perform the act of reading the data from a source location and storing the data in a temporary data structure for the later stages of the ETL operation.

Reader module 460 may receive a first subset of configuration parameters from first execution module 450 and/or from the management module 440. In addition to the management module 440 and execution module (e.g., first execution module 450) configuration parameters discussed above, reader module 460 may receive additional configuration parameters comprising one or more of a data format, a data location, a data schema, or data custom options. The data format may indicate an encoding type of the data, such as JSON, CSV, parquet, orc, text, delta, or others. The data location may indicate a source location where the data should be read from. Additionally or alternatively, the data location may be a table name or a file location. The data schema may indicate one or more data types for the temporary data structure. For example, the data schema may indicate data types for each column of CSV source data. The data schema may specify that data in a first column is stored as a DateTime object in the temporary data structure, for example, when the data format is a CSV and a first column refers to a date. The data schema may indicate other configurations depending on a format of the source data, a type of temporary data structure used to temporarily store the extracted data, a third-party instance for performing the ETL operation, and/or a computing language used in the ETL operation. The first subset of configuration parameters may also contain additional formatting parameters to properly parse the source data. For example, the first subset of configuration parameters may comprise an indication that a source data file contains a header line which should not be treated as source data.

Reader module 460 may trigger methods in a third-party ETL instance to access, read, and store the source data, for example, when a third-party ETL instance is used. The use of a third-party ETL instance may allow an ETL operation to be scaled according to the source data without requiring direct configuration by the user. Other benefits may be realized through the use of a third-party ETL instance, including, for example, parallel processing of source data read from large and/or distributed databases.

Reader module 460 may store the source data within a temporary data structure and return the temporary data structure, or a reference to the temporary data structure, to management module 440. Management module 440 may then pass the temporary data structure to the next execution module in the order of execution. As shown in FIG. 4, management module 440 may pass execution of the data to the second execution module 452.

Second execution module 452 may be associated with a transform stage of the ETL operation. Upon receiving the data from management module 440, second execution module 452 may initialize transform module 470. Transform module 470 may perform one or more actions to transform the read data into the desired data per a set of transform instructions. As discussed with respect to FIG. 1B, a transformation operation may comprise a plurality of operations, such as conversion to a different data format, creation of a new table based on source data, calculation of new data based on source data, and/or more.

Transform module 470 may receive, from second execution module 452 and/or from management module 440, a second subset of configuration parameters. In addition to the management module 440 and execution module (e.g., second execution module 452) configuration parameters discussed above, transform module 470 may receive additional configuration parameters comprising at least one of an executable statement parameter and/or a logging parameter.

Transform module 470 may receive an executable statement parameter from the second subset of configuration parameters passed to the second execution module 452 from the management module 440. The executable statement parameter may be a file or path to a file containing an executable statement. The executable statement may be written in a computing language compatible with the temporary data structure containing the data read by reader module 460. The executable statement may be a Structured Query Language (SQL) query. Additionally or alternatively, the executable statement may be written in Python, C, R, or another computing language. Transform module 470 may use the third-party data processing instance to further execute the executable statement. This structure may allow a user to realize advantages from a third-party data processing instance, such as parallel processing of transform operations, while maintaining the benefits of discrete stages in the ETL operation.

Transform module 470 may receive a logging parameter indicating that transform module 470 should log the output of the executable statement. Transform module 470 may use a third-party logging instance to facilitate logging, as initialized by management module 440 and discussed above. Additionally or alternatively, transform module 470 may log the output of the executable statement to a console visible to a user.

Transform module 470 may store the output of the executable statement in a second temporary data structure. The second temporary data structure may be the same as the first temporary data structure containing the information read by reader module 460. Alternatively, the second temporary data structure may be different from the first temporary data structure.

After the executable statement has been executed, transform module 470 may pass the second temporary data structure, containing the output of the executable statement, to the second execution module 452, which may pass the temporary data structure to management module 440. The management module 440 may pass the second temporary data structure to the next execution module in the order of execution. The second temporary data structure may also comprise data extracted from the source location by reader module 460 that was not modified by transform module 470. Transform module 470 may also send an indication to second execution module 452 that the transform operation is complete.

Based on a determination that the transform operation executed by transform module 470 is complete, the third execution module 454 may trigger writer module 480 to write the transformed data to a destination location. Writer module 480 may receive a third subset of configuration parameters from the third execution module 454 and/or the management module 440. In addition to the management module 440 and execution module (e.g., third execution module 454) configuration parameters discussed above, writer module 480 may receive additional configuration parameters comprising an output data structure name, an output location, a file format indicator, a save mode indicator, a plurality of partition configurations, a cache indicator, and/or a persistence indicator.

An output data structure name may indicate a name for a data structure in which the transformed data will be saved. The output data structure name may be the name of a database table or a new name for a new data structure within the output location.

An output location may indicate a location to where the transformed data will be saved. The output location may indicate at least one of a file path, a location within a data warehouse, or other data storage locations.

A file format indicator may indicate a type of file to be saved, where the file comprises at least the data within the second temporary data structure. For example, the file type may comprise one or more of JSON, parquet, orc, text, CSV, delta, or any equivalent thereof. Writer module 480 may also receive additional configuration parameters for configuring the output file.

The save mode indicator may indicate the proper conflict handling procedure if the transformed data already exists at the destination location. The save mode indicator may indicate the proper conflict handling procedure for conflicts where a file of the same name as the output data structure name parameter already exists. The save mode indicator may indicate the proper conflict handling mode for conflicts, for example, if a record within the transformed data already exists within the location indicated by the output data structure name parameter and the output location parameter. For example, the save mode indicator may indicate the proper procedure handling for the conflict where a row in the transformed data indicates a first identifier in a destination table, but the first identifier is already found in the destination table. Example settings for the save mode indicator may comprise one or more of "overwrite," "append," "ignore," "errorifexists," or other conflict handling procedures.

Writer module 480 may receive a plurality of partition configuration parameters. The partition configuration parameters may indicate how the data should be partitioned across one or more destination locations. The plurality of partition configuration parameters may not be used, for example, when the destination location comprises a single server or partition. Alternatively, the plurality of partition configuration parameters may provide logic for partitioning the data before writing to the one or more destination locations.

Writer module 480 may receive cache and/or persistence configuration parameters indicating additional steps for the second temporary data structure, comprising the data to be written. The cache indicator may indicate that the second temporary data structure should be cached before writing to the destination location. The persistence indicator may indicate that the second temporary data structure should be unpersisted or removed from local memory after the write operation has been completed.

Writer module 480 may use a third-party ETL instance to write the data. The third-party ETL instance may be received from management module 440 via the third execution module 454. Additionally or alternatively, writer module 480 may use a third-party data processing instance to finish steps from the transform operation, e.g., in the case of a lazily performed transform operation. The third-party data processing instance may be received from management module 440 via the third execution module 454. Writer module 480 may use a third-party logging instance to log information, such as status updates, errors, or more to a log. The third-party logging instance may be received from management module 440 via the third execution module 454. Additionally or alternatively, writer module 480 may directly execute instructions to save the data in the output location. Writer module 480 may cause information about the write operation to be displayed.

Based on a determination that writer module 480 has completed the write operation, management module 440 may update a status of the ETL operation to indicate that the ETL operation has been completed. Based on the determination that the ETL operation has been completed, management module 440 may cause an indication that the ETL operation has been completed to be displayed and/or logged.

Figure 5:
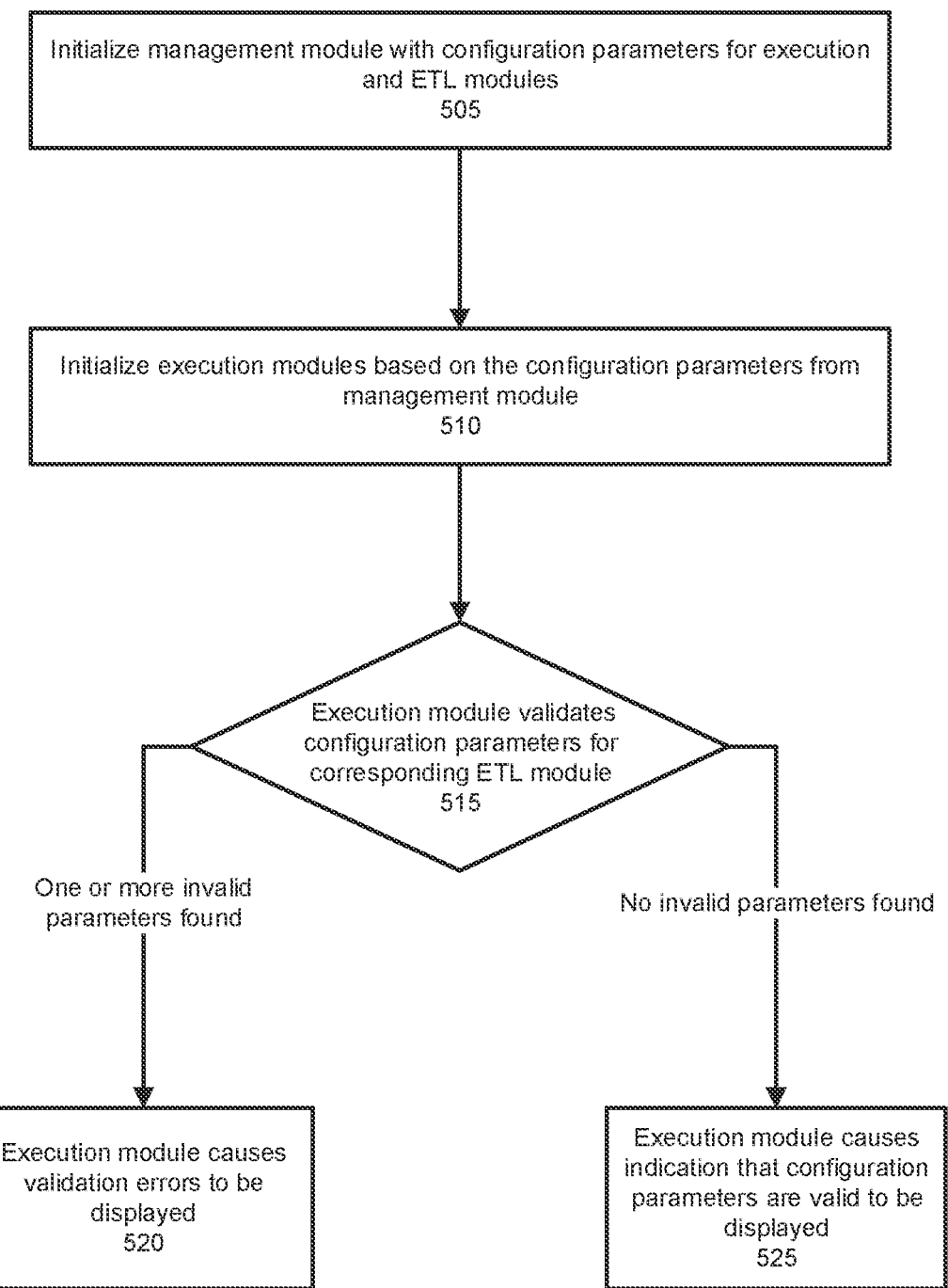
FIG. 5 shows an example of a process for initializing and validating the configuration parameters for an ETL process.

A benefit of the described technology is the ability to manage configuration parameters from one central location and to be able to validate the configuration parameters before attempting an ETL operation. FIG. 5 shows an example of an embodiment in which a management module runs a validation process across all of the configuration parameters and execution modules. In FIG. 5, a management module may be understood as similar to management module 440 discussed with respect to FIG. 4; execution modules may be similar to execution modules (e.g., first execution module 450, second execution module 452, third execution module 454) in FIG. 4; reader, transform, and writer modules ("ETL modules") may be similar to reader module 460, transform module 470, and/or writer module 480 in FIG. 4.

In step 505, the management module may be initialized with a plurality of configuration parameters for a plurality of execution modules and corresponding ETL modules. The management module may confirm that the plurality of configuration parameters are valid, for example, by determining that all necessary parameters have been provided, stage number parameters have no duplicates, file locations exist, etc. If one or more parameters are determined to be invalid, the management module may cause an output to be displayed comprising an indication of an invalid parameter.

In step 510 of the embodiment displayed in FIG. 5, the management module initializes all of the execution modules based on the configuration parameters in the management module. As described in more detail with respect to FIG. 4, this step may comprise the management module initializing the execution modules based on the corresponding subset of configuration parameters. The management module may also provide access to a third-party data processing instance, a third-party ETL instance, and/or a third-party logging instance.

In step 515, an execution module may determine if the subset of configuration parameters corresponding to that execution module are valid. For example, a first execution module classified for a read operation may confirm that a first subset of configuration parameters associated with the first execution module comprises the necessary parameters for a read operation and/or that the first subset of configuration parameters has valid values. For example, the first execution module may confirm that a data location parameter, corresponding to the source location as described with respect to FIG. 4, is provided and/or corresponds to an existing and/or accessible source location. Further specialized validation procedures may be configured and performed based on the proper validation procedures for a given configuration parameter. Similarly, a second execution module classified for a transform operation may confirm that a second subset of configuration parameters comprises the necessary parameters for a transform operation. This validation process may be repeated for each of the execution modules. Step 515 may be repeated for each execution module provided for in the configuration parameters.

If an execution module determines that one or more of the configuration parameters in the subset of configuration parameters is invalid, the execution module may cause validation errors to be displayed in step 520. The execution module may cause a validation error to be displayed to a console, such as a console on a computing device (e.g., computing device 110 in FIG. 1A). The execution module may cause validation errors to be logged in a status log. Step 520 may be repeated for each execution module which determines that a validation error exists in the corresponding configuration parameters.

Based on a determination that one or more configuration parameters in the subset of configuration parameters are invalid, a management module or an execution module may cause an indication of the one or more invalid configuration parameters to be displayed. In response to the indication of the one or more invalid configuration parameters, the management module or an execution module may receive a subset of valid configuration parameters to be used in place of the one or more invalid configuration parameters.

If an execution module determines that all of the configuration parameters in the subset of configuration parameters are valid, the execution module may cause an indication of valid configuration parameters to be displayed in step 525. The management module and/or execution modules may be initialized with the subset of valid configuration parameters when executing the ETL operation.

The benefit of the validation process is that the validation process allows configuration parameters to be validated before attempting to execute an ETL operation. Such a process would allow invalid configuration parameters to be discovered earlier and corrected more quickly. Additionally, such a process would avoid the difficulty of the ETL operation completing valid ETL stages before failing on an invalid stage, requiring a user to determine how much of the ETL operation completed and if the incomplete ETL operation may be undone to re-run the ETL after the invalid configuration parameters have been corrected.

Figure 6:
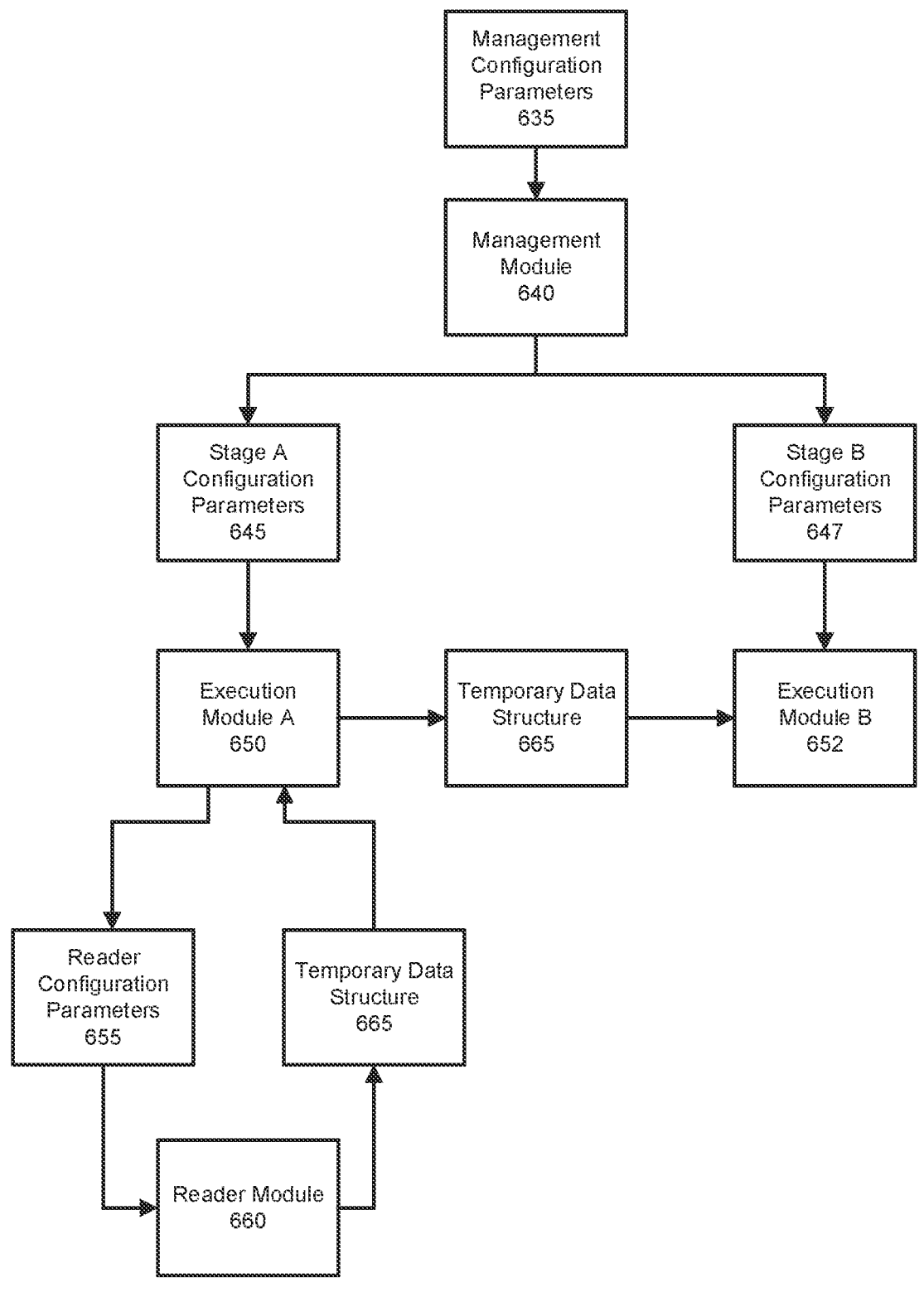
FIG. 6 shows an example of the software executing one stage of an ETL operation.

FIG. 6 displays an example of a management module organizing and transferring data from a first execution module to a second execution module. Management configuration parameters 635 may be a plurality of configuration parameters to be incorporated into management module 640 when the ETL operation begins and management module 640 is initialized. Management configuration parameters 635 may be a JSON dictionary or any equivalent thereof. Management configuration parameters 635 may also comprise first stage configuration parameters 645, corresponding to first execution module 650; second stage configuration parameters 647, corresponding to second execution module 652; and/or reader configuration parameters 655, corresponding to reader module 660. Additionally or alternatively, first stage configuration parameters 645, second stage configuration parameters 647, reader configuration parameters 655, and/or further configuration parameters for further modules may be stored separately from management configuration parameters 635.

Management module 640 may be similar to management module 440 in FIG. 4. Management module 640 may be initialized with management configuration parameters 635; management configuration parameters 635 may additionally contain configuration parameters for configuring a plurality of execution modules.

The first stage configuration parameters 645 may be a subset of management configuration parameters 635. Management module 640 passes the first stage configuration parameters 645 to the first execution module 650 as part of the initialization of the execution modules. Similarly, management module 640 passes the second stage configuration parameters 647 to the second execution module 652. Management configuration parameter 635 may comprise configuration parameters for n execution modules. Management module 640 may create one or more execution modules and pass the nth corresponding subsets of the management configuration parameters 635 to the nth execution module.

The first execution module 650 may initialize an ETL module, for example, based on the type of stage that the first stage configuration parameters 645 specifies. The first stage configuration parameters 645 may classify the first execution module 650 as a "read" stage. The first execution module 650 may initialize a reader module 660, incorporating reader configuration parameters 655. Further description of execution module configuration parameters may be found above with respect to FIG. 4.

Reader module 660 may read data from a first location and may store the read data in temporary data structure 665. Temporary data structure 665 may be a temporary data structure used to pass data from one ETL module to the next. Additionally or alternatively, temporary data structure 665 may be a proprietary temporary data structure. For example, temporary data structure 665 may be a data frame as implemented in Apache Spark, pandas, and/or Python or other implementations of similar data structures. Temporary data structures are further discussed with respect to FIGS. 3 and 4.

When reader module 660 completes the read operation, reader module 660 may return temporary data structure 665 to the first execution module 650. The first execution module 650 may further return temporary data structure 665 to management module 640. Based on a determination that the read operation has completed, management module 640 may then trigger the second execution module 652 to execute, passing temporary data structure 665 to the second execution module 652. This allows sequential operations to operate on data processed by prior execution modules without requiring each execution module to repeat steps covered by prior execution modules.

The transfer of temporary data structure 665 may not be a transfer of temporary data structure 665 itself, but a reference indicating a location for temporary data structure 665. The second execution module 652, or another sequential execution module, may use the reference to locate and operate directly on temporary data structure 665. This allows sequential operations to operate on data processed by prior execution modules without requiring each execution module to repeat steps covered by prior execution modules.

Figure 7:
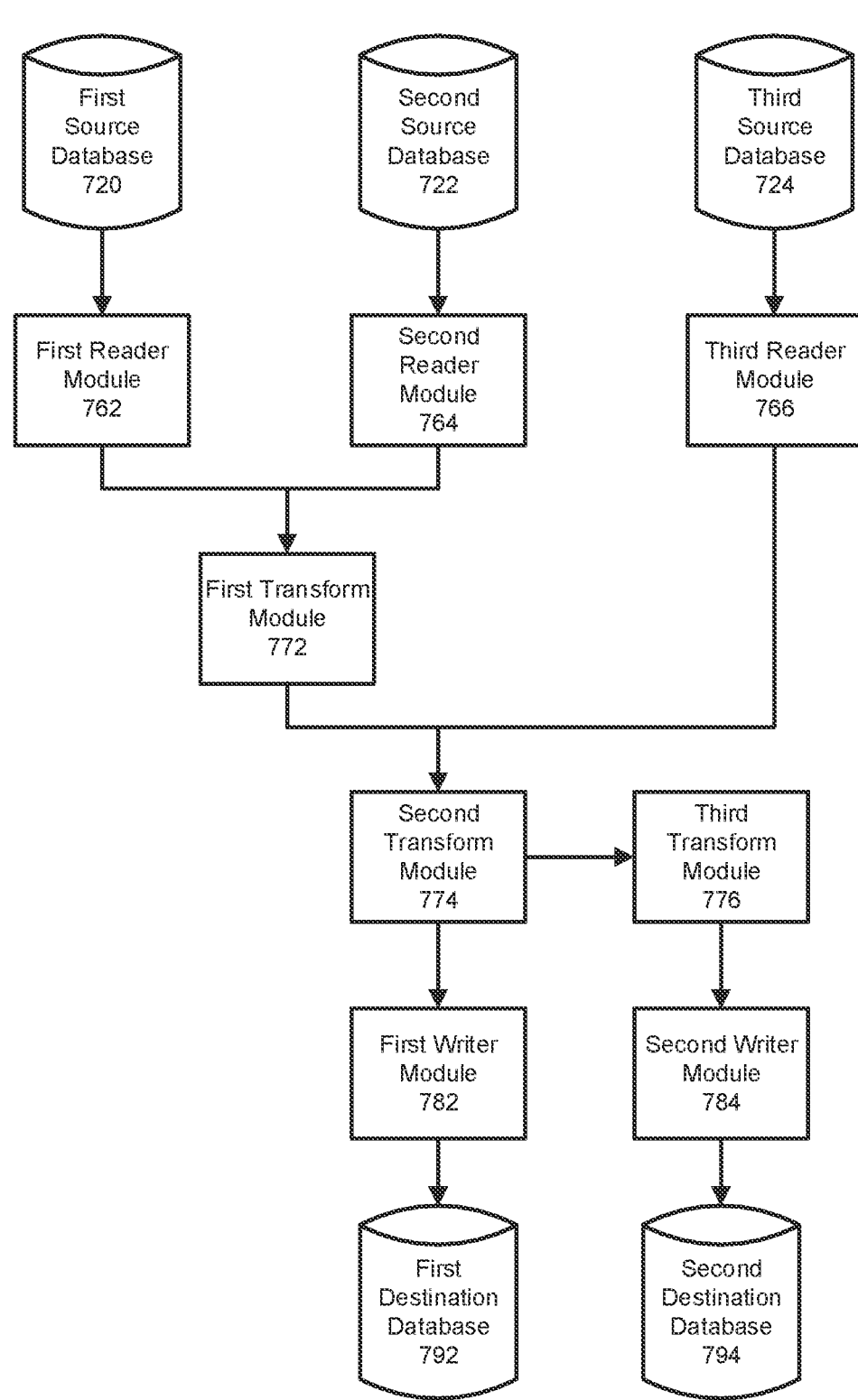
FIG. 7 shows an example of a complex ETL operation with multiple source databases, multiple transformations, and multiple destinations.

FIG. 7 provides an example of a more complex ETL operation, involving multiple source locations, transformations, and destination locations. In FIG. 7, which displays multiple ETL modules, the ETL modules may be initialized from a management module akin to management module 440 from FIG. 4 and may be executed from execution modules akin to execution modules (e.g., first execution module 450, second execution module 452, third execution module 454) from FIG. 4. However, due to the complexity of the example ETL operation, a management module and corresponding execution modules are not displayed in FIG. 7.

First reader module 762 may read first data from first source database 720. Second reader module 764 may also read second data from second source database 722. The process by which first reader module 762 and second reader module 764 read data from first source database 720 and second source database 722 may be similar to the read operation processes described with respect to FIG. 3 and/or FIG. 4.

First reader module 762 may pass (e.g., send, transmit, transfer) a first temporary data structure to first transform module 772. The first temporary data structure may comprise first data extracted (e.g., read) from first source database 720. Second reader module 764 may pass (e.g., send, transmit, transfer) a second temporary data structure to first transform module 772. The second temporary data structure may comprise second read data extracted (e.g., read) from second source database 722. The passing of the first and second temporary data structures to transform module 772 may be similar to the processes and techniques described above with respect to FIG. 6.

After receiving the temporary data structures from the first reader module 720 and the second reader module 722, the first transform module 772 may then complete a first transform operation on the first data and the second data. The transformation processes performed by first transform module 772 may be similar to the transform operations described above with respect to FIG. 3 and FIG. 4.

Upon completion of the first transform operation, first transform module 772 may pass (e.g., send, transmit, transfer) first transformed data to second transform module 774. As shown in FIG. 7, second transform module 774 may also receive a third temporary data structure from third reader module 766. The third data may comprise data read from third source database 724. Third reader module 766 may complete a third read operation corresponding to third source database 724 before or after the first transform operation. The order of execution parameters may be defined by the configuration parameters to allow a step corresponding to any ETL stage to be completed at any point within the operation. The order of execution parameter may allow the read operation corresponding to third reader module 766 to occur after a first transform stage. Additionally or alternatively, the read operation performed by third reader module 766 may occur concurrently with the first transform stage or at the same time the first data and the second data are read by first reader module 762 and second reader module 764, respectively. Although ETL operations are traditionally executed in one order—extract, then transform, then load—the configuration parameters may define an order of execution that allows for stages to be executed in a customized order.

After receiving first transformed data from first transform module 772 and third read data from third reader module 766, the third transform module 774 may complete a second transform operation using both the first transformed data and third read data. Third transform module 774 may then pass (e.g., send, transmit, transfer) second transformed data to one or more modules. As shown in FIG. 7, second transform module 774 may pass (e.g., send, transmit, transfer) the second transformed data to both first writer module 782 and/or third transform module 776.

First writer module 782 may write (e.g., load) the second transformed data to first destination database 792. The process by which the first writer module 782 performs a write (e.g., load) operation may be similar to the processes described above for a write or load operation discussed with respect to FIGS. 3 and 4.

Third transform module 776 may execute a third transform operation on the second transformed data. Upon completion of the third transformation operation, third transform module 776 may pass a third transformed data to second writer module 784.

Second writer module 784 may then write (e.g., load) the third transformed data to second destination database 794. The process by which the first writer module 782 performs a write (e.g., load) operation may be similar to the processes described above for a write or load operation discussed with respect to FIGS. 3 and 4.

Using the techniques described above, the present disclosure provides for modularization, management, and status logging for ETL operations. Aspects described further provide improvements to configuration management for an ETL operation, the ability to run validation checks over configuration parameters before beginning an ETL operation, and the ability to break up complex executable statements over ETL stages into more manageable statements over multiple modules. Furthermore, aspects described provide for incorporating the modular management system into a third-party ETL or data processing instance, allowing the improvements realized herein to be applied to large scale or specialized ETL processes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:

receiving, by a computing device, a request to transfer information from a plurality of databases to a data warehouse;

initializing, based on a plurality of configuration parameters, a management module configured to coordinate execution of a plurality of stages of an extract, transform, load (ETL) operation from the plurality of databases to the data warehouse;

initializing, by the management module, a plurality of execution modules, wherein an execution module is associated with each stage of the plurality of stages, and wherein initializing an execution module further comprises;

determining, by the execution module, whether a subset of the plurality of configuration parameters for the execution module is valid, wherein:

based on the subset of the plurality of configuration having an invalid configuration parameter, causing an indication of invalid configuration parameters to be displayed, receiving a subset of valid configuration parameters, and initializing the execution module based on the subset of valid configuration parameters;

reading, using a first execution module, data, in a first format, from a first database of the plurality of databases;

updating, by the management module and based on a determination that the data has been read from the first database, a stage of the ETL operation indicating that the data has been read;

transforming, using a second execution module and based on the stage of the ETL operation indicating that the data has been read, the data to a second format;

updating, by the management module and based on a determination that the data has been transformed, the stage of the ETL operation to indicate that the data has been transformed;

writing, using a third execution module and based on the stage of the ETL operation indicating that the data has been transformed, the data to the data warehouse;

updating, by the management module and based on a determination that the data has been written to the data warehouse, the stage of the ETL operation to indicate completion of the ETL operation; and causing, by the management module and based on the stage of the ETL operation indicating completion of the ETL operation, an indication that the information has been transferred from the plurality of databases to the data warehouse to be displayed.

2. The method of claim 1, further comprising:

determining, by the first execution module, an initialization time of a read operation;

determining, by the first execution module, a completion time of the read operation; and causing, based on a determination that an execution time of the read operation exceeded a threshold, an error to be displayed.

3. The method of claim 1, wherein updating the stage of the ETL operation further comprises:

causing, after each execution module completes execution of a stage of the ETL operation, a status of the ETL operation to be displayed in a log entry.

4. The method of claim 1, wherein the plurality of configuration parameters comprises a JavaScript Object Notation (JSON) dictionary.

5. The method of claim 1, wherein the execution module associated with each stage of the plurality of stages comprises a third-party program.

6. The method of claim 1, wherein completion of each stage of the plurality of stages comprises:

passing, to the management module, a temporary data structure comprising updates completed by the execution module associated with each stage of the plurality of stages.

7. The method of claim 1, wherein initializing the first execution module further comprises:

incorporating, into the first execution module, a first subset of configuration parameters from the plurality of configuration parameters, wherein the first subset of configuration parameters comprises one or more of the first data format, a location for the plurality of databases, or a first schema for a format of a first temporary data structure.

8. The method of claim 1, wherein reading using the first execution module further comprises:

reading the data from the first database;

writing the data into a first temporary data structure; and providing, to the management module, the first temporary data structure.

9. A computing device, comprising:

one or more processors; and memory storing instructions that, when executed by the one or more processors, cause the computing device to:

receive, by a computing device, a request to transfer information from a plurality of databases to a data warehouse;

initialize, based on a plurality of configuration parameters, a management module configured to coordinate execution of a plurality of stages of an extract, transform, load (ETL) operation from the plurality of databases to the data warehouse;

initialize, by the management module, a plurality of execution modules, wherein an execution module is associated with each stage of the plurality of stages, and wherein initializing an execution module further comprises:

determining, by the execution module, whether a subset of the plurality of configuration parameters for the execution module is valid, wherein:

based on the subset of the plurality of configuration having an invalid configuration parameter, causing an indication of invalid configuration parameters to be displayed, receiving a subset of valid configuration parameters, and initializing the execution module based on the subset of valid configuration parameters;

read, using a first execution module, data, in a first format, from a first database of the plurality of databases;

update, by the management module and based on a determination that the data has been read from the first database, a stage of the ETL operation indicating that the database has been read;

transform, using a second execution module, the data to a second format based on the stage of the ETL operation indicating that the database been read;

update, by the management module and based on a determination that the data has been transformed, the stage of the ETL operation to indicate that the data has been transformed;

write, using a third execution module and based on the stage of the ETL operation indicating that the data has been transformed, the data to the data warehouse;

update, by the management module and based on a determination that the data has been written to the data warehouse, the stage of the ETL operation to indicate completion of the ETL operation; and cause, by the management module and based on the stage of the ETL operation indicating completion of the ETL operation, an indication that the information has been transferred from the plurality of databases to the data warehouse to be displayed.

10. The computing device of claim 9, wherein the instructions, when executed by the one or more processors, cause the computing device to initialize the second execution module by:

incorporating, into the second execution module, a second subset of configuration parameters from the plurality of configuration parameters, wherein the second subset of configuration variables comprises at least one of a first temporary data structure, a second temporary data structure, or an executable statement to modify the data in the first temporary data structure.

11. The computing device of claim 10, wherein the instructions, when executed by the one or more processors, cause the computing device to transform the data by:

executing the executable statement to modify the data in the first temporary data structure.

12. The computing device of claim 11, wherein the executable statement comprises a Structured Query Language (SQL) statement.

13. The computing device of claim 9, wherein the instructions, when executed by the one or more processors, further cause the computing device to:

determine, by the first execution module, an initialization time of a read operation;

determine, by the first execution module, a completion time of the read operation; and cause, based on a determination that an execution time of the read operation exceeded a threshold, an error to be displayed.

14. The computing device of claim 9, wherein the plurality of configuration parameters comprises a JavaScript Object Notation (JSON) dictionary.

15. One or more non-transitory computer-readable media storing instructions that, when executed by one or more processors, cause a computing device to perform steps comprising:

receiving, by a computing device, a request to transfer information from a plurality of databases to a data warehouse;

initializing, based on a plurality of configuration parameters, a management module configured to coordinate execution of a plurality of stages of an extract, transform, load (ETL) operation from the plurality of databases to the data warehouse;

initializing, by the management module, a plurality of execution modules, wherein an execution module is associated with each stage of the plurality of stages, and wherein initializing an execution module further comprises:

determining, by the execution module, whether a subset of the plurality of configuration parameters for the execution module is valid, wherein:

based on the subset of the plurality of configuration having an invalid configuration parameter, causing an indication of invalid configuration parameters to be displayed, receiving a subset of valid configuration parameters, and initializing the execution module based on the subset of valid configuration parameters;

reading, using a first execution module, data, in a first format, from a first database of the plurality of databases;

updating, by the management module and based on a determination that the data has been read from the first database, a stage of the ETL operation indicating that the data has been read;

transforming, using a second execution module and based on the stage of the ETL operation indicating that the data has been read, the data to a second format;

updating, by the management module and based on a determination that the data has been transformed, the stage of the ETL operation to indicate that the data has been transformed;

writing, using a third execution module and based on the stage of the ETL operation indicating that the data has been transformed, the data to the data warehouse;

updating, by the management module and based on a determination that the data has been written to the data warehouse, the stage of the ETL operation to indicate completion of the ETL operation; and causing, by the management module and based on the stage of the ETL operation indicating completion of the ETL operation, an indication that the information has been transferred from the plurality of databases to the data warehouse to be displayed.

16. The one or more non-transitory computer readable-media of claim 15, wherein the instructions, when executed by the one or more processors, cause the computing device to initialize the third execution module by:

incorporating, into the third execution module, a third subset of configuration parameters from the plurality of configuration parameters, wherein the third subset of configuration parameters comprises at least one of a plurality of output locations, an output file format, or a partition configuration setting.

17. The one or more non-transitory computer-readable media of claim 16, wherein the instructions, when executed by the one or more processors, cause the computing device to write the data to the data warehouse by:

determining, using the partition configuration setting, a destination within the plurality of output locations; and writing the data to the destination.

18. The one or more non-transitory computer readable-media of claim 15, wherein the instructions, when executed by the one or more processors, further cause the computing device to perform steps comprising:

determining, by the first execution module, an initialization time of a read operation;

determining, by the first execution module, a completion time of the read operation; and causing, based on a determination that an execution time of the read operation exceeded a threshold, an error to be displayed.

19. The one or more non-transitory computer readable-media of claim 15, wherein the plurality of configuration parameters comprises a JavaScript Object Notation (JSON) dictionary.

20. The one or more non-transitory computer readable-media of claim 15, wherein the instructions, when executed by the one or more processors, further cause the computing device to perform steps comprising:

passing, to the management module, a temporary data structure comprising updates completed by the execution module associated with each stage of the plurality of stages.

* * * * *